R. C. SERMON.
ROBE CLAMP.
APPLICATION FILED JULY 26, 1915.
1,197,960.
Patented Sept. 12, 1916.
2 SHEETS—SHEET 1.
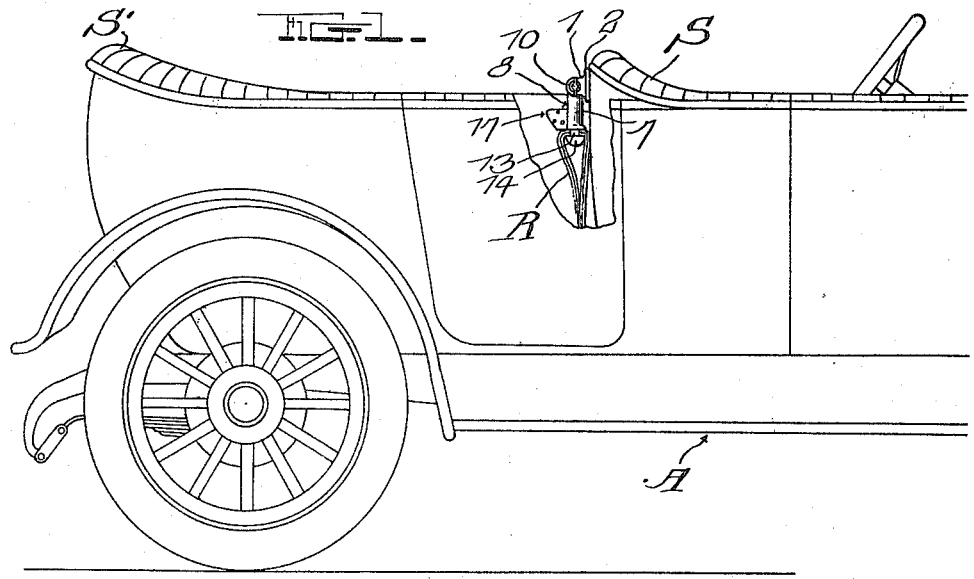
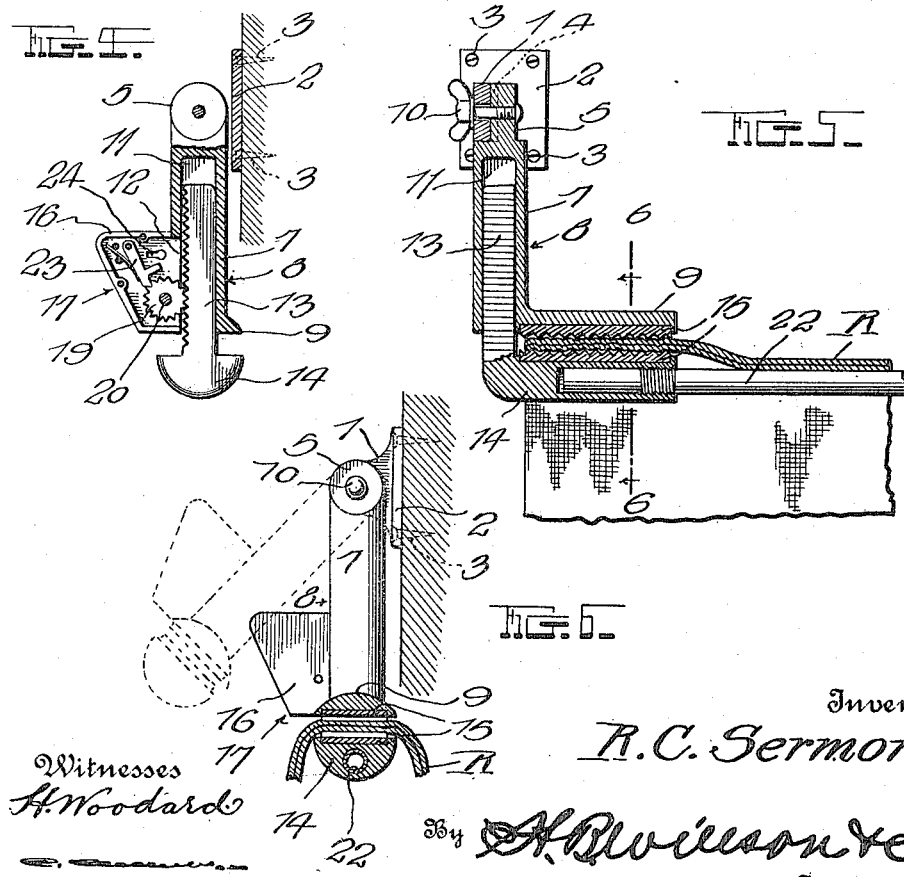
Inventor
R. C. Sermon
Witnesses
H. Woodard
By H. R. Wilson & Co.
Attorneys

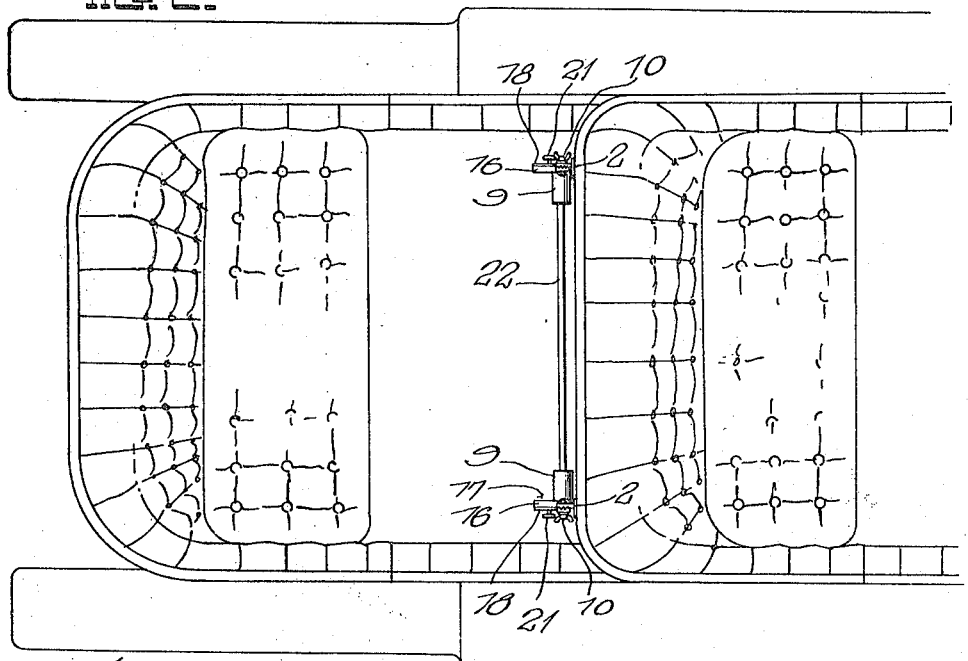
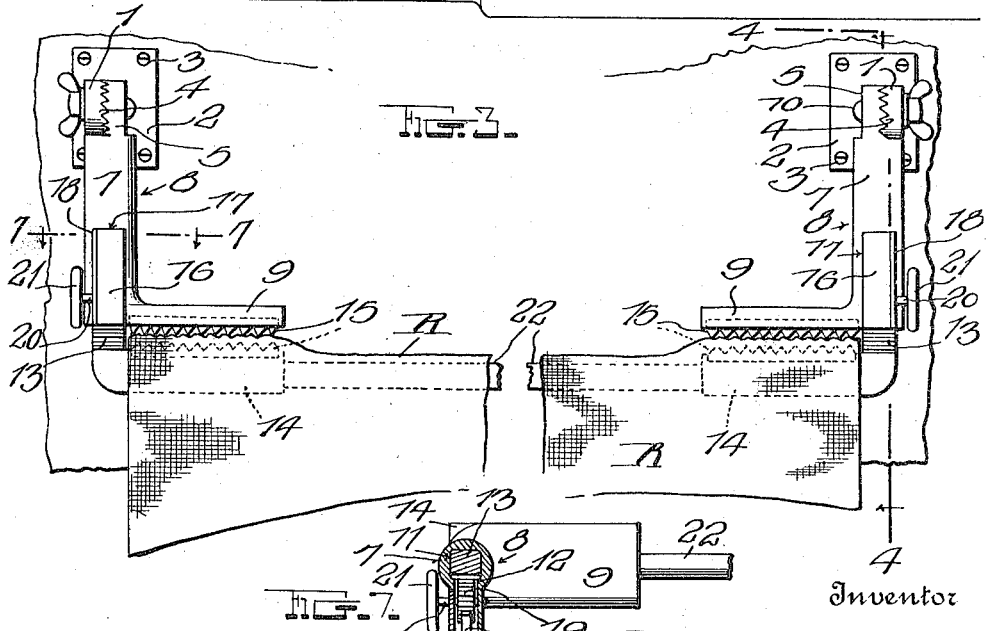

UNITED STATES PATENT OFFICE.

ROBERT CREXFORD SERMON, OF WEST DULUTH, MINNESOTA.

ROBE-CLAMP.

1,197,960. Specification of Letters Patent. Patented Sept. 12, 1916.

Application filed July 26, 1915. Serial No. 42,017.

*To all whom it may concern:*

Be it known that I, ROBERT C. SERMON, a citizen of the United States, residing at West Duluth, in the county of St. Louis and State of Minnesota, have invented certain new and useful Improvements in Robe-Clamps; and I do declare the following to be a full, clear, and exact description of the invention, such as will enable others skilled in the art to which it appertains to make and use the same.

My invention relates broadly to improvements in clamps, and more particularly to those designed primarily for the retention of lap robes and garments against theft from motor vehicles.

The object of the invention is to provide a device of this class which although being of extremely simple construction and therefore inexpensive to manufacture and market, will be highly efficient in operation. With this general object in view, the invention resides in certain novel features of construction and in the unique combinations of parts hereinafter claimed and fully described by reference to the accompanying drawings wherein:—

Figure 1 is a side elevation of an automobile equipped with the invention, a portion of the machine being broken away; Fig. 2 is a top plan view of the parts shown in Fig. 1; Fig. 3 is a rear elevation of a portion of the front seat back showing the invention on an enlarged scale; Fig. 4 is a vertical transverse section as seen on the plane indicated by the line 4—4 of Fig. 3; Fig. 5 is a vertical longitudinal section through one end of the clamp; Fig. 6 is a vertical transverse section as seen on the plane indicated by the line 6—6 of Fig. 5; Fig. 7 is a detail horizontal section as viewed along the plane indicated by the line 7—7 of Fig. 3.

In these drawings which constitute a part of the application and in which similar reference characters designate corresponding parts throughout the several views, A indicates a portion of an automobile having the usual front and rear seats S and S'. It is to the back of the front seat S that the invention is applied.

The device comprises a pair of spaced ears 1 which project from attaching plates 2 secured by screws or the like 3 to the seat back, said ears having on one side a plurality of teeth 4 which engage similar teeth on additional ears 5 carried by the upright arms 7 of a pair of L-shaped bracket members 8, the horizontal arms 9 of said members being extended toward and spaced from each other. The ears 1 and 5 are shown in the present application as pivoted to each other by thumb screws 10 which pass loosely through the ears 1 and are threaded into the ears 5, whereby when these screws are tightened, swinging of the bracket members 8 will be prevented, and whereby such swinging movement may well take place when the screws are loosened for properly adjusting the device to seats having backs inclining at various angles.

The upright arms 7 of the bracket members 8 are provided with upright bores 11 which open through their lower ends and with openings 12 which communicate with said bores. The bores 11 receive therein the upright rack bars 13 having laterally extending jaws 14 formed integrally with their lower ends and disposed beneath the arm 9, the latter likewise constituting jaws. All of these jaws are provided in their adjacent faces with cavities receiving therein corrugated rubber grips 15.

Carried by and formed integrally with the upright arms 7 of the two bracket members 8, are the fixed sections 16 of a pair of housings 17, such housings preferably having front plates 18 riveted thereto as clearly shown in Figs. 4 and 7. The housings 17 are disposed over the openings 12 in the upright arms 7 and receive therein pinions 19 which project through said openings and whose teeth interengage those of the upright rack bars 13, said pinions being secured to independent horizontally disposed shafts 20 having knobs or the like 21 disposed on the exterior of the housings 17, whereby rotation of these knobs will adjust the rack bars 13 vertically to move the jaws 14 forcibly toward the arms 9 for the purpose of clamping a robe or the like R between the grips 15, the portion of said robe between the two jaws 14 being supported by an appropriate robe rail 22 whose opposite ends are threaded into the facing ends of said jaws.

When a robe or garment is gripped by the clamping means at the opposite ends of the rail 22, it becomes expedient to automatically lock the jaws 14 against receding from the arms 9, thereby preventing removal of the article. For so doing, the spring pressed locking dogs 23 are pivoted in the two housings 17, such dogs being normally engaged with the teeth of the pinions 19 to prevent movement thereof in a direction to lower the jaws 14. When a legitimate user of the robe or other article secured in the device, wishes to remove the same, however, an appropriate key (not shown) may be inserted successively in the two key-holes 24 to retract the locking dogs 23, whereupon the rack bars 13 and the jaws 14 may be successively shifted downwardly. Independent downward movement of the two rack bars 13 and 14 will be allowed, since the rod 22 will yield sufficiently for this purpose.

Although the invention is very simple and may be inexpensively manufactured and marketed, it will be found to be efficient in operation and to possess a number of advantageous characteristics.

In the drawings, certain specific details of construction have been shown for accomplishing probably the best results, and in the preceding such details have been described, but it will be evident that I need not be limited thereto otherwise than to the extent to which the appended claims restrict me.

I claim:—

1. A robe clamp comprising a pair of spaced L-shaped bracket members whose horizontal arms extend toward each other and whose upright arms are each provided with an upright bore opening through the lower end thereof and with an opening leading into said bore, a pair of upright rack bars slidable vertically in the bores of the two bracket members and having laterally extending jaws disposed beneath the horizontal arms of said members, a robe rod secured at its ends to said jaws, a housing carried by the upright arm of each bracket member and disposed over the opening therein, manually rotatable pinions disposed one in each housing and extending through the aforesaid openings into mesh with the teeth of the rack bars for the purpose of shifting the latter vertically, and locking means in the housings to lock the pinions against movement in one direction.

2. A robe clamp comprising a pair of L-shaped bracket members whose horizontal arms extend toward each other and whose upright arms are each provided with an upright bore extending through the lower end thereof, and with an opening leading into said bore, upright rack bars slidable vertically in the two bores and having laterally extending jaws disposed beneath the horizontal arms of the bracket members, a horizontal robe rod secured at its end to said jaws, a housing carried by the upright arm of each bracket member and disposed over the opening therein, manually rotatable pinions disposed one in each housing and extending through the aforesaid openings into mesh with the teeth of the rack bars for the purpose of shifting the latter vertically, and key-released spring-pressed locking dogs in the housings engaging the pinions to normally prevent rotation thereof in one direction.

In testimony whereof I have hereunto set my hand in presence of two subscribing witnesses.

ROBERT CREXFORD SERMON.

Witnesses:
B. F. SCHWEIGER,
ABE H. MILLER.

Copies of this patent may be obtained for five cents each, by addressing the "Commissioner of Patents, Washington, D. C."